UNITED STATES PATENT OFFICE.

WILLIAM M. RUTHRAUFF, OF CHICAGO, ILLINOIS.

DENTIFRICE.

1,225,362.  Specification of Letters Patent.  Patented May 8, 1917.

No Drawing.  Application filed October 2, 1916. Serial No. 123,212.

*To all whom it may concern:*

Be it known that I, WILLIAM M. RUTHRAUFF, a citizen of the United States, residing at Chicago, in the county of Cook and State of Illinois, have invented certain new and useful Improvements in Dentifrices, of which the following is the specification.

My invention relates to improvements in a dentifrice and particularly to a dentifrice which, in addition to performing cleaning and polishing functions, actively counteracts dental caries and increases the resistance of the soft tissues of the mouth to infection.

Dental caries (or tooth decay) is generally occasioned by acid forming bacteria harbored under mucin plaques which form upon and tenaciously adhere to the teeth. Acids produced by these bacteria dissolve away the cementing substance in the interprismatic spaces between the enamel rods, which incases and supports these rods. The ends of the enamel rods, being thus exposed, easily break off; this process continues until the enamel has been penetrated, whereupon rapid decomposition of the dentine proceeds.

Objects of my invention are: to counteract dental caries by providing an acid dentifrice, incapable of attacking the teeth, but which owing to its acidity will stimulate normal salivary activity, thus bringing about a condition which promotes the health of the mouth, and to employ as an essential constituent of said dentifrice a hard substance so compounded as to be carried in solution into the interprismatic spaces in the enamel and other interstices of the teeth and there precipitated by the action of the saliva so as to be actually deposited in the interprismatic and other interstices of the teeth and so solidify and harden the surface of the tooth, and to combine therewith an abrasive agent to assist in the breaking down and removal of the bacteria harboring plaques.

Another object of the invention is to increase the vital resistance to infection of the soft tissues of the mouth by the application of a soluble calcium salt.

Other objects and advantages of the invention will appear as the description to follow proceeds.

My invention in its preferred form consists of tri-basic calcium phosphate, soluble monobasic calcium phosphate, and calcium chlorid. It is made by the combination of tri-basic calcium phosphate (the substance of which the teeth are composed) with an acid (for instance, hydrochloric). The calcium phosphate and acid combine, forming soluble mono-basic calcium phosphate and calcium chlorid. The compound is preferably made with an excess of the tri-basic calcium phosphate. This excess performs a plurality of functions:—It eliminates the possibility of deleterious action upon the teeth by the acid employed for the reason that such acid will have exhausted itself upon the tri-basic calcium phosphate in the dentifrice before it can act upon this same substance in the teeth; the excess of tri-basic calcium phosphate acts as an abrasive agent to assist in the destruction of the bacteria harboring mucin plaques; and fine particles of the excess tri-basic calcium phosphate may be introduced into the interprismatic and other interstices of the teeth and there enveloped and sealed in by the deposit of more of the same substance so as to augment the regenerative process carried on in the tooth surface.

When a dentifrice so compounded is employed, the acidity of the dentifrice keeps in solution the mineral salts in the saliva which otherwise, and particularly where an alkaline dentifrice is employed, may deposit upon and harden the mucin plaques. It also promotes both the flow and the alkalinity of the saliva. This in itself conduces to the health of the teeth. The alkaline saliva then neutralizes the soluble monobasic calcium phosphate, which has penetrated into the minute interprismatic and other interstices of the teeth, thereby converting this soluble mono-basic calcium phosphate into the insoluble tri-basic calcium phosphate, and causing the precipitation and deposit of said tri-basic calcium phosphate, the natural cementing substance of the teeth, in those spaces. The continual use of the dentifrice solidifies and compacts the tooth surface by constant minute accretions of the natural cementing substance of the teeth.

It is of course to be understood that other mineral salts which are capable of entering in solution in an acid which will be neutralized with the resulting precipitation of such salts on contact with the saliva in such a manner as to cause solidification of the enamel, may be added to or substituted for the tri-basic calcium phosphate; and other abrasive agents than the excess of tri-basic calcium phosphate above specified might be employed, the essential part of my invention being to cause the presence in the mouth of a liquid containing mineral salts in solution capable of penetrating the interprismatic and other minute external spaces of the teeth and there being precipitated by the action of the saliva and deposited to solidify the tooth surface and counteract and repair its disintegration by continual minute accretions.

The use of my dentifrice is not only beneficial where the enamel still remains but also where the enamel has been broken through, where it will deposit in the dentinal tubuli the natural cementing substance of the tooth, solidifying and hardening the exposed surfaces, impregnating them with precipitated tri-basic calcium phosphate and rendering them insensitive and resistant to dental caries.

A dentifrice compounded according to my invention might be made up, for instance, as follows:—

To 25 pounds of impalpable powdered tri-basic calcium phosphate, add 1790 c. c. of distilled water with 79 c. c. of hydrochloric acid. The substance so compounded will be an acid dentifrice inert to teeth, promoting by its acidity healthful conditions in the mouth and furthermore carrying calcium salts in solution capable of permeating the minutest interprismatic and other spaces in the tooth surface, and there being neutralized by the saliva, to deposit in minute quantities the natural cementing substance of the tooth and solidify, strengthen and harden its surface.

A valuable feature of my dentifrice resides in its capacity to tone up the tissues of the mouth and increase their resistance to infection. Recent researches indicate that the calcium ion increases the vital resistance of the tissues, activates the leucocytes, increasing their phagocytic action to a marked degree, and further activates the agent which clots the blood. This clot is nature's means of preventing bleeding and of sealing a wound to protect granulation tissue from infection. These beneficial actions of the calcium ion are made directly available in my dentifrice because the calcium salts are made soluble and brought into intimate contact with all tissues in the mouth.

Another feature of importance is that my dentifrice will by itself, although acid in its nature, directly combine with any free acid in the mouth (owing to the excess of tri-basic calcium phosphate) thus remedying the "acid mouth" condition responsible for so much dental caries by direct neutralization as well as by promoting the flow and alkalinity of the saliva.

While I have disclosed my invention as a dentifrice, I am aware of various other beneficial uses thereof, particularly where it is desirable to bring a soluble calcium salt into initimate contact with bone or soft tissues.

Having now described my invention, I claim:

1. A dentifrice comprising an acid salt inert to the tri-basic calcium phosphate of the tooth structure, and capable of stimulating secretion of alkaline saliva and of reacting therewith to deposit tri-basic calcium phosphate in the interstices of the tooth surface.

2. A dentifrice acid in reaction, containing a soluble acid salt inert to the calcium phosphate of the tooth structure and adapted to stimulate the flow of saliva.

3. A calcifying dentifrice containing substantially calcium salts entering into the composition of the tooth held in a vehicle in such condition as to be acted upon by the saliva, and to be converted thereby and deposited on interstices of the tooth surface.

4. An acid dentifrice inert to the tooth structure, made by combining calcium phosphate in excess of the theoretical combining amount, with an acid, the excess calcium phosphate serving as a protective and abrasive agent.

5. A dentifrice comprising a soluble acid calcium salt inert to the structure of the teeth, adapted to be carried into intimate contact with the soft tissues in the mouth, whereby the antiphlogistic and hemostatic properties of the calcium ion are availed of to prevent inflammation and bleeding, and promote quick recovery of said tissues.

In witness whereof, I hereunto subscribe my name to this specification in the presence of two witnesses.

WILLIAM M. RUTHRAUFF.

Witnesses:
SEBASTIAN HINTON,
MYRTLE J. MILLER.